United States Patent [19]

Lemelson

[11] 4,285,523
[45] Aug. 25, 1981

[54] GAME AIMING DEVICE SECURABLE TO TELEVISION RECEIVER CABINET

[76] Inventor: Jerome H. Lemelson, 85 Rector St., Metuchen, N.J. 08840

[21] Appl. No.: 958,057

[22] Filed: Nov. 6, 1978

[51] Int. Cl.³ .............................................. A63F 9/22
[52] U.S. Cl. ................................ 273/313; 273/85 G; 273/DIG. 28
[58] Field of Search ............... 273/101.2, 102.5, 85 G, 273/101.1, 1 E, DIG. 28, 312, 313, 316; 340/709, 705, 710, 725; 358/250; 35/11 A, 25

[56] References Cited

U.S. PATENT DOCUMENTS

| | | | |
|---|---|---|---|
| 1,041,365 | 10/1912 | Stebbins et al. | 273/101.2 |
| 2,353,516 | 7/1944 | Sochaczewski | 273/101.2 |
| 2,712,975 | 7/1955 | Golseth et al. | 346/110 R |
| 3,151,248 | 9/1964 | Glaser et al. | 250/227 |
| 3,334,236 | 8/1967 | Bacon | 250/217 |
| 3,542,365 | 11/1970 | Gantz | 273/DIG. 28 |
| 3,614,314 | 10/1971 | Rossire | 358/250 |
| 3,659,285 | 4/1972 | Baer et al. | 273/DIG. 28 |
| 3,728,480 | 4/1973 | Baer | 273/DIG. 28 |
| 3,777,410 | 12/1973 | Robinson | 273/DIG. 28 |
| 3,778,058 | 12/1973 | Rausch | 273/DIG. 28 |
| 3,793,483 | 2/1974 | Bushnell | 178/69 |
| 3,809,395 | 5/1974 | Allison et al. | 273/101.2 |
| 3,829,059 | 8/1974 | Rupert | 251/44 |
| 3,921,161 | 11/1975 | Baer | 273/DIG. 28 |
| 4,006,474 | 2/1977 | Lukkarila | 273/DIG. 28 |
| 4,006,898 | 2/1977 | Greaf et al. | 273/DIG. 28 |
| 4,145,043 | 3/1979 | Olliges | 273/101.2 |

FOREIGN PATENT DOCUMENTS

| | | | |
|---|---|---|---|
| 517518 | 3/1955 | Italy | 178/7.85 |
| 1166838 | 10/1969 | United Kingdom | 273/1 E |

Primary Examiner—Anton O. Oechsle

[57] ABSTRACT

A television game apparatus employing electronic means to generate target images on a television screen and a device located away from the screen for taking aim and generating additional images on the screen, such as images simulating missiles such as balls shot, shells, torpedoes, etc., which are adapted to effect a score when they intercept other images on the screen. The aiming device and at least one manually operated switch for playing the game are incorporated in an arm or frame-like structure which is removable and easily applied to the housing of a television set such as by clamps, suction cups, magnets or other means. In one form, the securing means for the arm or frame is adjustable to accommodate it to different television cabinets of different sizes and configurations. In another form, the auxiliary missile and target generating electronic ciruitry is incorporated in the housing defined in the arm and sighting structure which is removably attached to the television cabinet. The sighting means may be fixed or movable at the end of the arm or structure and in a particular form, it is pivoted thereon by means of a handle or pair of handles to permit a sighting means thereof to be aimed at different locations on the screen of the television image generating monitor so as to vary the direction of one or more movable images generated on the television screen. The apparatus may also be employed to support and preposition a radiation generating game device such as a light beam generating simulated gun which, when a trigger or pushbutton operated switch is closed by hand generates and directs a pulse of light at the television viewing screen for scoring purposes.

12 Claims, 12 Drawing Figures

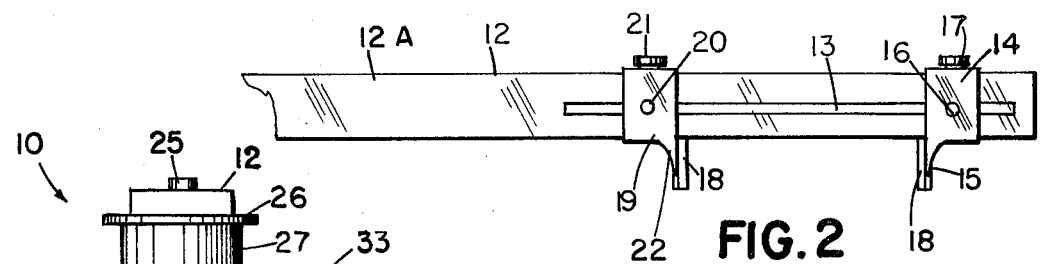
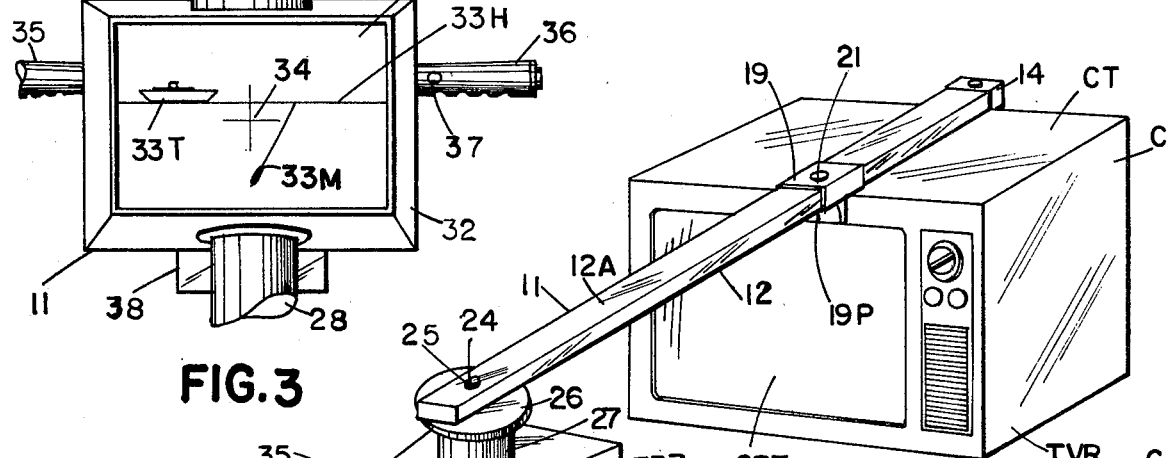
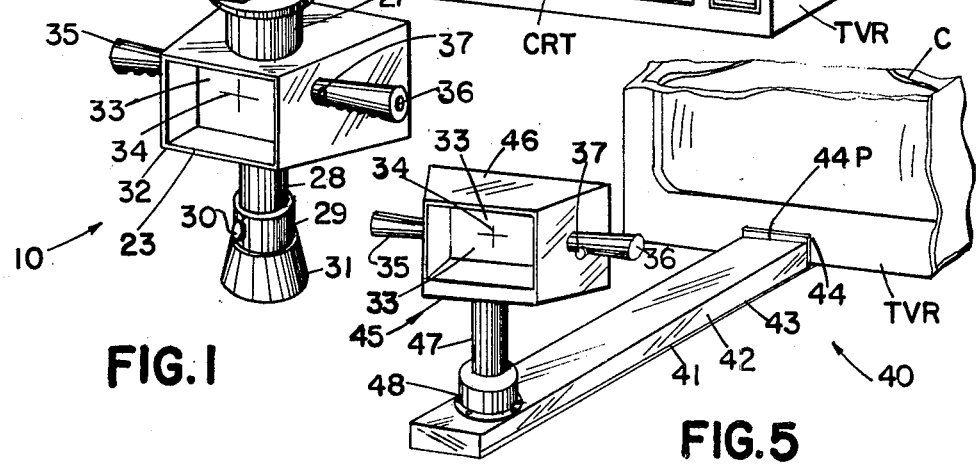
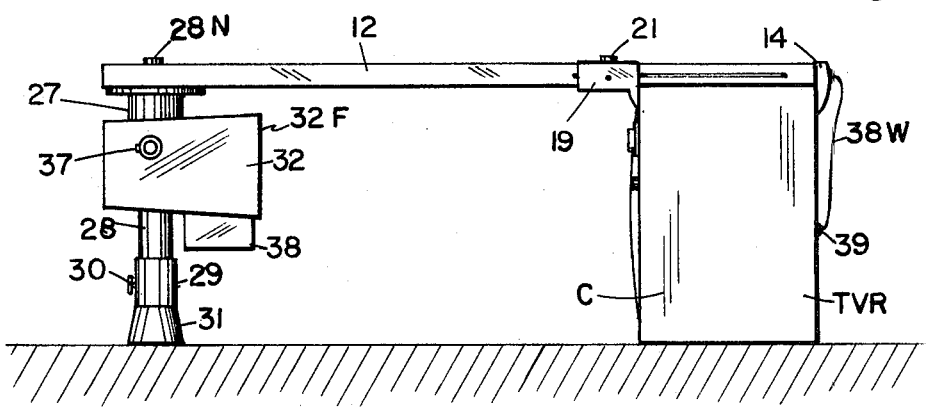
FIG. 1
FIG. 2
FIG. 3
FIG. 4
FIG. 5

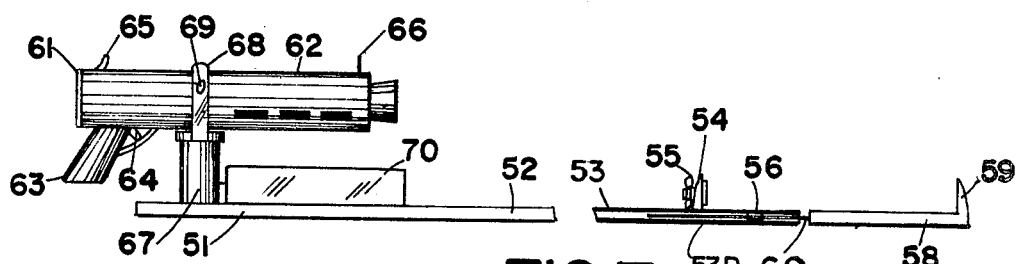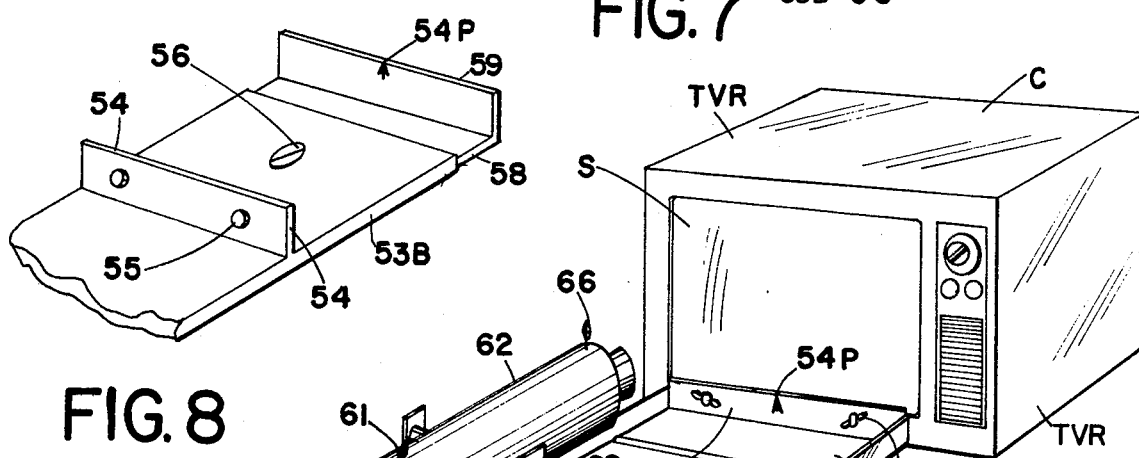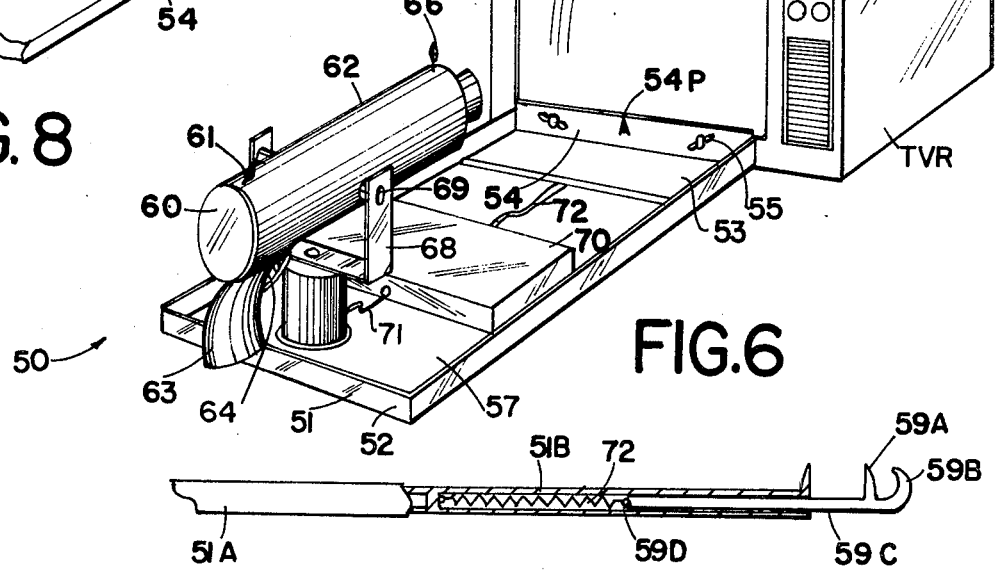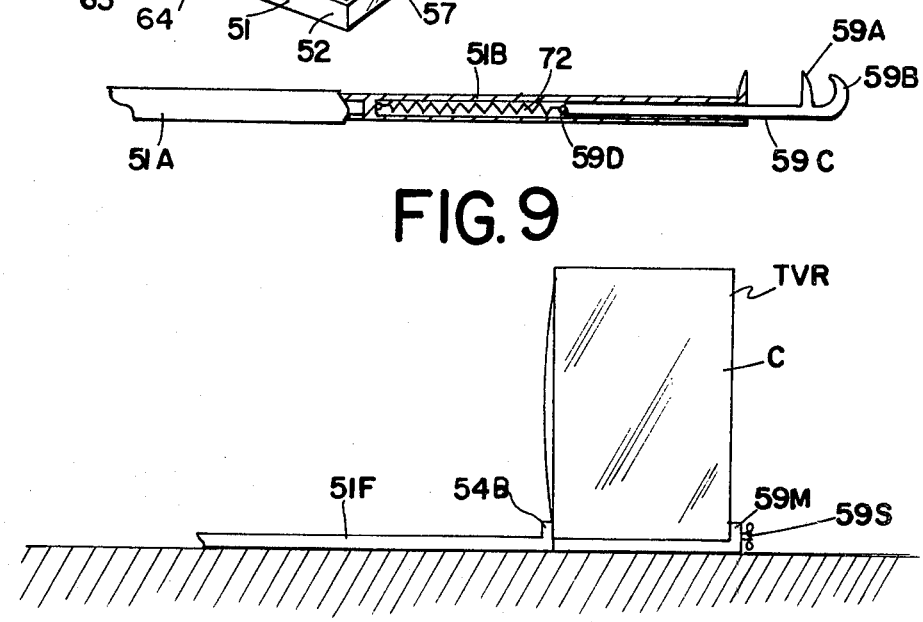

GAME AIMING DEVICE SECURABLE TO TELEVISION RECEIVER CABINET

SUMMARY OF THE INVENTION

This invention relates to game apparatus and a method for converting a conventional video receiver to a game device in which the game device includes an aiming device, such as a simulated gun or missile launcher which must be fixed or predetermined in location with respect to the viewing screen of the video receiver so that scoring may be properly effected. In particular, the invention is directed to a game apparatus which is readily and easily applied and adjustably fixed with respect to a variety of different video receivers containing cabinets of different heights, widths and depth.

A variety of electronically operated games have been developed which include electronic circuitry for generating images on the viewing screen of a cathode ray tube and manually operated means for controlling or affecting the appearance and/or movement of at least certain of the images so generated. While in certain of such games images of playing pieces or obstacles off which the playing pieces appear to be deflected, may be moved or generated by a simple push button operated switch or a finger varied variable potentiometer, other games require the use of an aiming device to affect or control the appearance or dissappearance of target, movement of the target or movement of a simulated missile. In most instances, the aiming device must be fixed with respect to the viewing screen of the video receiver in order to properly position it so that the person playing the game will be able to take aim or sight therealong and know when to operate a manual switch or video image control means for properly playing the game.

Video games which are manufactured for use with conventional video receivers have heretofore been limited to the types which involve moving or generating images on the viewing screen by a manually operated control wherein a sighting or aiming device is not required.

Accordingly, it is a primary object of this invention to provide a new and improved electronic game apparatus for use with conventional video receivers.

Another object is to provide an electronic game apparatus including one or more aiming devices therefore which may be adjustably positioned and fixed with respect to the viewing screen of a variety of different video receivers of different shapes and sizes.

Another object is to provide an electronic game apparatus having a sighting or aiming means which may be adjustably positioned with respect to the cabinet of a video receiver to permit it to be properly located and prepositioned with respect to the viewing screen thereof.

Another object is to provide an electronic game for use with a conventional video receiver and including an adjustable support for an aiming device, which support may be secured to a variety of different cabinets for television receivers and may be adjustably located thereon so as to preposition the aiming device supported thereby with respect to the viewing screens of the television receivers.

Another object is to provide a support for an aiming device for use in a television displayed electronic game wherein the support is adjustably secured to the cabinet of the television receiver and rotably supports an aiming device thereon.

Another object is to provide a support for an aiming device for use with a television receiver in an electronic game wherein the support is both adjustably securable to a variety of different cabinets and is adjustable in its latter location with respect to the viewing screens of the television apparatus supported in the cabinets so as to permit the aiming device to be properly aligned with the viewing screen and the person playing the game to properly take aim and score.

Another object is to provide an electronic game apparatus for use with a variety of different home television receivers and including a support for an aiming device associated with images generated on the viewing screen of the television receiver wherein the support is easily adjustably attached to and easily and rapidly removed therefrom to permit conventional viewing of the television receiver.

Another object is to provide an electronic game apparatus including a frame or beam for positioning and supporting an aiming device or other form of control means for images or for effecting scoring with respect to images which are generated on a television viewing screen wherein the support or frame contains electronic circuitry and wire leads for connecting such circuitry to the terminals of a television receiver to which the support is adjustably attached.

With the above and such other objects in view as may hereinafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed without departing from the nature and spirit of the invention.

In the drawings:

FIG. 1 is an isometric view of an electronic game apparatus which is adjustably securable to a television receiver and display;

FIG. 2 is a side view of a portion of the apparatus of FIG. 1;

FIG. 3 is an end view of part of the apparatus of FIG. 1;

FIG. 4 is a side view of the apparatus of FIG. 1 assembled to and supported in part by a television cabinet;

FIG. 5 is an isometric view of a modified form of the apparatus of FIGS. 1-4;

FIG. 6 is an isometric view of a modified form of the invention wherein support is provided for an aiming device by a frame which adjustably attaches to a television cabinet;

FIG. 7 is a side view of the apparatus of FIG. 6;

FIG. 8 is an isometric view of part of the adjustable portion of the apparatus of FIG. 6;

FIG. 9 is a side view with parts sectioned and broken away for clarity of a modified form of the apparatus of FIGS. 6 and 7;

FIG. 10 is a side view of a portion of a modified form of the apparatus of FIG. 6;

Figure 11:
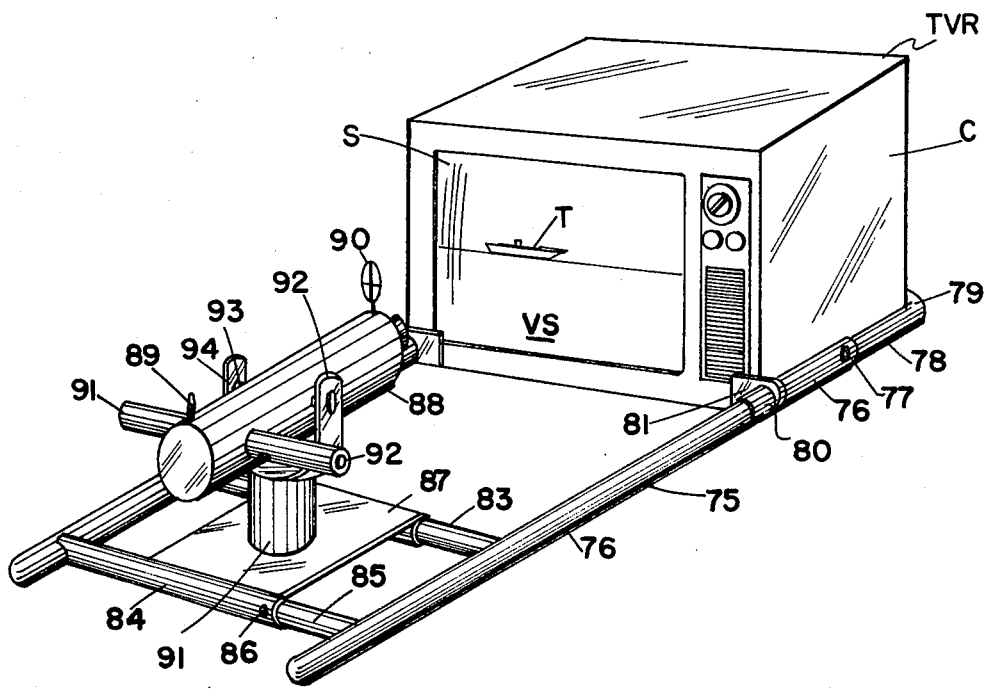
FIG. 11 is an isometric view of a modified form of the apparatus of FIGS. 6 and 7.

In FIG. 1 is shown a target apparatus 10 defined in part by an assembly 11 which is removably and adjustably attached to a box-like housing such as the cabinet of a conventional television receiver denoted TVR. Since the cabinets of commercially available television receivers vary not only in shape but also in their overall dimensions and the viewing screens of the television receivers supported within the cabinets may also vary in size and configuration, the assembly 11 is provided with means for its support from above which means is adjustable to accommodate and frictionally retain the assembly above and to the front of the cabinet of the television receiver TVR.

Primary support for the assembly 11 is afforded by means of a rigid channel or box beam 12 which rests against the top CT of the cabinet C of the television receiver TVR as illustrated. The beam or channel 12 may be formed of rigid plastic or metal and has an elongated slotted opening 13 formed in a side wall thereof or a plurality of such openings in the two side walls of the beam 12 to serve as guideways for either or both of two fixtures 14 and 19 which respectively engage the upper portions of the rear wall and front wall of the cabinet C of the receiver TVR to thereby support the outward extending portion 12A of the beam 12 above and beyond the cabinet.

Depending downwardly from the far end of the beam 12 is an assembly 23 which is composed of a sighting box 32 having a cylindrical extension 27 which protrudes above the top wall of the box and is supported on a disc 26 for rotation on a headed pin 24 which extends through and is supported near the end of the beam 12.

Extending below the sighting box 32 is a column or tube 28 which further rotates in the interior of a collar 29 in the lower end of which collar is disposed the upper neck of a frusto-conical base 31 which is longitudinally adjustable with respect to the column 28 by means of a set-screw 30 extending through a threaded opening in the collar 29 and engaging the lower end of the column 28. The collar 29 is therefore variably adjustable with respect to the tube 38 to permit the bottom of the base 31 to engage the surface on which the cabinet C rests, regardless of the height of the cabinet which determines the height above the resting surface the beam 12 is disposed when secured to the top wall CT of the cabinet C. By allowing the base 31 to contact the surface on which the cabinet C is disposed, and then tightening set-screw 30, an additional support is provided for the assembly 11 which will permit rotation of the sighting box 23 about the vertical axis of the column 28 and the pin 24 aligned therewith.

In FIG. 1, a plurality of hand grips 35 and 36 protrude outwardly from the side walls of the sighting box 32 and are employed to manually rotate the housing 23 about its vertical axis.

In FIGS. 3 and 4 a subhousing 38 is supported against the bottom wall of the sighting box 32. Subhousing 38 may be employed to contain, for example, a battery and microminiature electronic circuitry for generating logic which is employed, when suitable wires extending from subhousing 38 are either directly attached to inputs 39 at the rear wall of the television receiver TVR or through the column 27, the interior of the box beam 12 and over and around the rear clamping fixture 14, as shown in FIG. 4, to the proper input or antenna connecting locations 39 on the rear wall of the television cabinet C.

Notation 33 refers to a clear glass or plastic screen supported across the passageway in the sighting box 32 and containing one or more marks or arrays of marks such as the cross marks 34 which are printed or etched in the transparent screen 33 so as to permit a person viewing the surface of the monitor screen CRT of the receiver TVR to take aim at targets which are generated electronically on the viewing screen of the television receiver. A normally open push-button switch 37 may be supported by the handle 36 at a convenient location thereon such that it may be actuated by the thumb of the hand holding the handle. The switch 37 is preferably in electrical circuit with the electronic logic circuits located within housing 38 and when depressed by the thumb of the right hand of a person looking through the front end of the sighting housing 32 operates to generate one or more images on the screen CRT of the receiver TVR, such as images of balls, missiles or other devices which appear to be fired from a central location on the television screen and directed at targets which are electronically generated on said screen by conventional television game apparatus means.

The clamping fixtures 14 and 19 are each shown as each containing a pin 20 extending laterally thereacross, which pin rides in the slotted openings 13 in the side walls of the box beam 12. Adjustment means in the form of set-screws or locking screws 17 and 21, are mounted on the top walls of the clamping devices 14 and 19 and, when tightened thereagainst, frictionally retain the clamps in place such as against the upper rims of the front and rear walls of the cabinet C. The assembly 11 is also laterally adjustable across the top of the cabinet to permit a center line 19P or marker provided on the clamping fixture 20 to be aligned with the center line or a marker provided on the television cabinet C.

The sighting means is in the form of simulated cross hairs or lines 34 which are painted, printed, molded in or scribed across the transparent plate 33 which is mounted within the housing 32. The plate which is supported within the housing 32 is mounted a sufficient distance from the front opening 32F to permit the lines 34 to serve as a sight and permit a person playing the game to take aim by rotating the housing 32 about its vertical axis by means of handles 35 and 36. When a target appearing on the viewing screen of the television display CRT push-button 37 is depressed, the electronic circuitry which is connected to the switch of push-button 37 is activated and causes an image of a missile or otherwise simulated object to move in a given direction upwardly and across the screen CRT toward the target or in advance of the target in an attempt to score a hit on the target.

To properly synchronize the location of the sighting lines 34 with the missiles and targets appearing on the screen CRT, a pointer or marker line 19P is provided on the front face of the clamping device 19 and may be used to align the assembly 11 with a predetermined location of the cabinet C such as the vertical center line of the screen CRT or face of the picture tube.

In FIG. 1, notation 25 refers to a knurled nut secured to the threaded end of the shaft or pin 24 defining the vertical axis about which the housing 32 is pivoted. Nut 25 serves to assemble the housing assembly 23 to the overhead supported beam 12.

In FIG. 2, notations 17 and 21 refer respectively to set-screws extending through threaded portions of the clamps or brackets 14 and 20 which, when tightened, frictionally secure said clamps at the desired locations along the beam 12 to clampingly engage the beam to the front and rear walls of the cabinet C as shown in FIG. 1. Notations 18 refer to flexible rubber pads which are secured to the inside faces of the brackets 14 and 20 to cushion the assembly with the cabinet C.

In FIG. 3, the screen 33 within the housing 32 is shown containing a line 33H which may be permanently part of the screen or an image formed electronically on the viewing screen to represent, the horizon, and notation 33T represents an image of a target such as a simulated boat which is caused to move across the viewing screen of the television receiver and screen 33. Notation 33M refers to the image of a simulated missile which is caused to move across the screen of the picture tube of the receiver TVR when a switch is closed by depressing the pushbutton 37 located on handle 36, a function which requires the skill of the operator in estimating the time it will take for the target 33T to travel to a location on the screen in advance of the target wherein the sighting lines 34 assist the player of the game in making such estimate.

In FIG. 5 is shown a modified form of the apparatus of FIGS. 1-4 wherein the sighting device is supported from below and the support therefor extends beneath the television cabinet C and is clampingly engaged to the lower portions of the front and rear walls of the cabinet. The sighting device comprises a box-like enclosure 46 of trapezoidal shape which is open in the front and rear and which contains, as part of the assembly 45, a pivotal support (not shown) for an upstanding column or tube 47 to permit the sighting device 46 to be pivoted about a vertical axis to take aim at target images which are electronically generated on the viewing screen of the receiver located in front of the sighting device as illustrated. As in FIG. 1, a viewing screen 33 is provided within the housing 46 and contains crossed lines 34 at the central portion thereof for sighting purposes. Handle grips 35 and 36 extend laterally from the housing and a push-button 37 is located on 36 to be operated by the thumb holding the handle and, in so doing, to close a switch for the described purposes.

The column 47 is supported by a collar 48 which is secured to the upper wall of a box-beam 42 which forms part of an adjustable assembly 41 including a clamping fixture 44 adapted to engage the front wall of the cabinet C and a sheet-like extension 43 of the beam 42 which passes under the cabinet and contains a clamping device, similar to 14 of FIG. 1, for engaging the rear wall of the cabinet. The rear wall clamping device is longitudinally movable along the extension 43 to permit it to engage the rear walls of cabinets of different depths and to hold assembly 41 at the clamped location against the cabinet. Notation 44P refers to a marker or pointer provided on or extending from the clamping device 44 for aligning the assembly 41 with a mark or center line location of the viewing screen of the picture tube of the television receiver TVR. The apparatus 40 of FIG. 5 contains one or more wire pairs extending from the switch activated by the push-button 37 through the column 47 to electronic circuitry and a battery located within the box-beam 42 and further wires extending through the interior of the box-beam 42 along the extension 43 thereof to the rear of the television cabinet C where said wires are connected to the input aerial terminals of the television receiver so as to permit the electronic circuitry located in beam 42 to be utilized in generating target and missile images on the screen of the picture tube of the receiver.

While a single push-button operated switch is provided in the embodiments illustrated in FIGS. 1-5 for generating a pulse which is employed in controlling circuits of the computer employed to generate target and/or missile images on the viewing screen of the television receiver, it is noted that two or more manually operated switches or electrical devices such as variable potentiometers, variable capacitors, or variable inductors may be supported by handle, pistol grip or other means forming part of the aiming device and may be employed to control the generation of images or targets or vary their composition or movement.

Typical electronic game circuitry which may be employed to generate images on the viewing screens of the television receivers to which the apparatus illustrated in the drawings is connected may be found in such U.S. Pat. Nos. as 3,659,285; 3,728,480; 3,778,058; 3,793,483; 3,829,059; 3,921,161; 4,006,474; 3,971,925; and 4,006,898.

In FIG. 6 is shown a modified form of the apparatus of FIG. 5 which includes a game apparatus 50 which is adjustably secured to the bottom portion of a cabinet C for a television receiver TVR. The apparatus 50 includes a box-like frame 51 formed of a plurality of channels or box-beams 52 containing an L-shaped channel 53 at one end thereof. The L-shaped channel 53 has a vertical leg 54 containing a plurality of openings therein which support headed screws 55 which, when turned in the threaded openings, extend and retract from the end wall 54 to engage the lower portion of the cabinet C in compression. Adjustably movable from the end of the frame 52 is a flat plate 58 having a vertical leg 59 which is adapted to engage the rear wall of the cabinet. A set-screw 56 passing through a threaded hole in the upper wall of a hollow extension 53B of the leg 53 is employed to engage and retain the leg 58 of the angle plate which includes the vertical leg portion 59 engaging the rear wall of the cabinet C so that an initial course adjustment of the fixture may be made to permit the cabinet C to be placed between the legs 54 and 59 whereafter the set-screws 55 may be tightened to frictionally engage the front wall of the cabinet C and thereby hold the assembly 50 in firm engagement with the cabinet. Located near the other end of the frame 51 on a cylindrical support 67 which is mounted on a plate 57 supported by frame 51 is an aiming device in the form of a simulated gun 60 having an elongated cylindrical tubular barrel 62 which is pivotally supported on a yoke 68 for rotation about a horizontal axis which yoke is pivotally supported on column 67 for rotation about a vertical axis thus allowing the simulated gun 60 to be pivoted about two axes and aimed at different locations of the viewing screen S of the picture tube of the television receiver TVR. Notation 69 refers to a pin or shaft extending between the legs of the yoke 68 and notations 65 and 66 refer to respective rear and front sights of the simulated gun 60 which sights are located along the upper wall of the barrel 62.

A pistol grip 63 is secured to the rear of the barrel 62 and a trigger 64 is located to permit the forefinger of the hand holding the pistol grip to close a switch connected to the trigger which switch functions to activate electronic circuitry for indicating a hit on a target appearing on the screen S when the sights 65 and 66 define a line which intersects the particular target image generated on the screen S.

Notation 54P refers to a marker or pointer located at the center of the vertical clamping leg 54 for aligning the frame 51 with the vertical center line of the image screen S of the television receiver prior to tightening set-screws 55 against the front wall of the cabinet C.

Notation 70 refers to a housing extending across the frame 51 in which housing is secured electronic circuitry which is connected by a cable 71 through the support 67 and the yoke 68 to the trigger operated switch of simulated gun 60. A cable 72 extends from the housing 70 along the bottom of the frame to the rear wall of cabinet C where the wires thereof may be connected by means of suitable connectors to the antenna inputs to the television circuitry located within the cabinet.

In FIG. 9 is shown a modified form of an extension of a frame 51A of the type shown in FIG. 6 wherein the means clampingly engaging the rear and front walls of the television cabinet C from below is spring loaded by means of a coil spring 72 extending along and through the hollow frame or plate substituted for the frame and denoted 51B. Connected to the end of the coil spring 72 is an L-shaped bracket containing vertical legs 59A and 59B extending from a horizontal plate 59C, the end 59D of which is connected to one or more coil springs located within or extending along the interior of the frame and connected at its other end to the frame.

In FIG. 10 is shown a television receiver cabinet C supported on and between vertical legs or bracket portions 54B and 59M of the frame 51F which supports the simulated aiming device or gun as shown in FIG. 6. Notation 59S refers to a set-screw extending through the leg 59B for frictionally securing the frame assembly to the cabinet C after the cabinet has been disposed between the legs 54B and 59M.

In the embodiments illustrated in FIGS. 7, 9, and 10, it is noted that a single, narrow box-beam or channel formation such as the beam 12 of FIGS. 1–5 may replace the wider frames of the types illustrated in FIGS. 8 and 6 as a suitable means for properly supporting and positioning the aiming device or gun away from the cabinet C and prepositioned with respect to the television viewing screen S. Additional support may also be provided, if necessary, above the support and positioning means of FIGS. 6–12 by means of a beam or frame supported by one or more vertical beams above the lower frame and extending to the top wall of the cabinet where it is temporarily fastened thereto as illustrated in FIG. 1, for example. It is also noted that the sighting enclosures 32 and 46 of FIGS. 1 and 5 may extend closer to the cabinet of the television receiver than illustrated, if necessary to enhance and improve the images which are observed in looking therethrough.

An auxiliary enclosure may also be provided to mask ambient light. Such auxiliary enclosure may be supported from the frame or beam extending to the cabinet and supporting the aiming device and may be made of opaque sheet material supported by the beam or frame supporting the aiming device by the use of a frame or beam attached to the sheet material and the beam or frame which extends between the aiming device and the cabinet of the television receiver.

It is also noted that electrical connection between electrical components supported by the aiming device, the computer circuits for controlling target and missile images on the screen of the television receiver, a battery and the television receiver itself may also be provided by means of electrical brushes and wiping elements provided at the pivotal axes of the aiming device which elements are connected to flexible wires or printed circuit elements extending along the described components.

It is also noted that the sighting devices of FIGS. 6–12 may include means for generating a beam of light and directing same at the target television screen for scoring purposes, as illustrated, for example, in U.S. Pat. Nos. 3,334,236 and 3,151,248.

Figure 12:
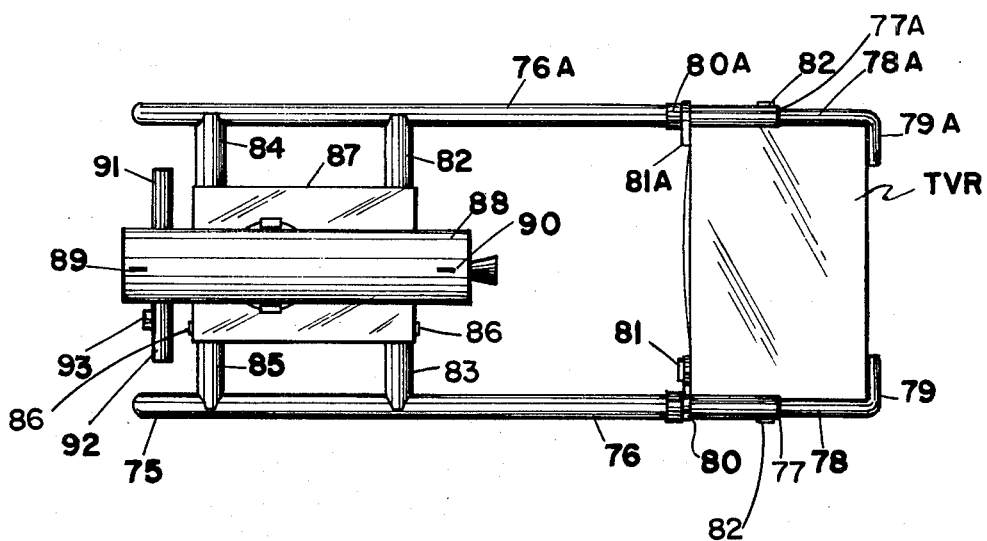
FIG. 12 is a plan view of the apparatus of FIG. 11.

FIGS. 11 and 12 illustrate details of an assembly of metal or plastic tubes or rod-shaped members or frame portions made by molding which assembly is adjustably securable to the lower extremities of the cabinet C for television receiver TVR as described wherein a plurality of different size cabinets may be so accommodated. The frame or support 75 is composed of parallel tubular members 76 and 76A which are open at their far end 77 and 77A each of which retains an L-shaped tube or rod, denoted 78 and 78A, which may telescope outwardly therefrom to accommodate cabinets C of different depths. Set-screws 82 extending through threaded holes in tubes or rods 76 and 76A frictionally retain the L-shaped members 78 and 78A in position after they have been made to engage the rear wall of cabinet C. Brackets 80 and 80A are also frictionally secured to the tubular members 76 and 76A by means of set-screws to provide adjustment thereof or may be permanently secured near the ends of the rods 76 and 76A.

At the far end of the frame 75 two parallel tubes 82 and 84 are secured to the longitudinal frame member 76A and respective rods or tubes 83 and 85 telescope into the ends thereof and are secured to the longitudinal frame member 76 to provide lateral adjustment of the frame in accordance with the width of the television camera C. Set-screws 86 frictionally secure the members 83 and 85 within the tubes 82 and 84 and the plate 87 extends across and is secured to the tubes 82 and 84 for supporting a cylindrical mount 91 for a simulated gun barrel 88. Sights 89 and 90 are secured to the top portion of the barrel 88 and are used to aim the gun at selected targets T appearing on the screen S of the television receiver TVR. The barrel 88 is pivotal about a horizontal axis by means of a yoke 92 supporting a pin 93 extending through the legs of the yoke and the barrel. The barrel 88 is also pivoted about a vertical axis by rotatably supporting the yoke 92 within the vertical support column 91. A push-button 93 connects to a normally open switch in one of the two handles 91 and 92 extending laterally from the barrel 88 and is utilized to activate electronic circuitry for effecting simulated hits on targets T appearing on the screen S when the line of sight defined by sights 89 and 90 intersects the targets and the push-button is depressed by hand.

In each of the embodiments illustrated in the drawings, electrical connection between the push-button or the trigger operated switches and the electronic logic circuits may be effected by means of wires located in flexible cables which extend directly from the manual switches to the electronic circuits and electrical connection between the electronic circuits and batteries or line current may also be effected by means of wires in cables extending therefrom either along the pivoting axes or in a loose and flexible condition adjacent thereto. For example, a flexible loop of cable may extend from the barrel of the simulated gun 90 of FIGS. 11 and 12 from the manual switch in the handle 92, to the cylindrical support 91 which may contain the described microminiature circuitry. From the cylindrical support, the wire or cable may extend along the inside or adjacent the outside of the tubular members 82, 76A to the rear of the cabinet housing where attachment is made to the proper terminals of the television receiver circuits generally located thereat.

In the embodiments illustrated in the other drawings, flexible wires or cable may also extend loosely between the manually operated switch or switches and the electronic circuitry which may be located in any of the illustrated components including the handles, the supports for the sighting means, housings supported by said supports, etc.

I claim:

1. A game apparatus for use with a home style television receiver supported in a box-like cabinet wherein target images are generated on the display screen of said television receiver and scoring is effected by electronic circuit means which is operable to generate images on said display screen, said apparatus comprising:
    a first support,
    adjustable means secured to said first support for adjustably supporting and securing said first support to different cabinets of different television receivers containing television in picture display screens and wherein said first support extends substantially normal to the display screen of the television receiver to which said first support is secured,
    a second support supported by said first support near the end of said first support and disposed thereby a distance away from the display screen of the television receiver,
    an aiming device supported by said second support a substantial distance away from said display screen,
    sighting means associated with said aiming device for aiming said aiming device at the display screen of said receiver,
    manually operable means for moving said aiming device to permit said sighting means to be aimed at different locations of said screen, and
    manually operable electrical control means including a switch supported by said second support and accessible to a hand of the operator operating said manually operable means for moving said aiming device and controllable thereby to effect scoring with respect to target images generated on said screen.

2. A game apparatus in accordance with claim 1 wherein said adjustable means of said first support is operable to permit adjustment of said first support with respect to a television cabinet to which it is to be secured whereby said aiming device may be laterally aligned and centered with respect to the image screen of said television receiver.

3. A game apparatus in accordance with claim 1 wherein said first support is adjustably attachable to said television cabinet across the top wall thereof.

4. A game apparatus in accordance with claim 3 wherein said sighting means is pivotally supported below said first support.

5. A game apparatus in accordance with claim 4 including a pair of handles extending from opposite sides of said sighting means, and said switch is a push-button switch supported by one of said handles to be operated by the thumb of the hand holding said handle and, in being so operated, to control one or more images on the viewing screen of said television receiver.

6. A game apparatus in accordance with claim 1 wherein said first support is a single structural member in the configuration of a beam.

7. A game apparatus in accordance with claim 6 wherein said beam is a box beam, and wherein said means for securing said first support includes at least one clamping member which is variably adjustable along said box beam and which extends outwardly from said box beam to permit it to be engaged with and against the wall of said cabinet of said television receiver.

8. A game apparatus in accordance with claim 7 including electrical conducting means extending along said box beam between said manually operable control means and electrical terminal means at the rear wall of said cabinet which electrical terminal means is connected to the picture generating circuitry of the picture tube of said television receiver.

9. A game apparatus in accordance with claim 1 wherein said first support is adjustably supportable to said television cabinet along the lower extremity thereof.

10. A game apparatus in accordance with claim 9 wherein said first support extends beneath and along the bottom wall of said television cabinet and said means for securing said first support includes an upwardly extending gripping means supported at the end of said first support for engaging the rear wall of said television receiver cabinet.

11. A game apparatus in accordance with claim 9 wherein said means for securing said first support includes extensions adapted to engage the front and back walls of a television receiver cabinet to frictionally attach said first support thereto.

12. A game apparatus in accordance with claim 1 including means for laterally adjusting said first support with respect to a cabinet of a television receiver to permit said aiming device to be adjusted and properly centered with respect to the image screen of said television receiver.

* * * * *